(12) United States Patent
Steele et al.

(10) Patent No.: US 11,112,276 B2
(45) Date of Patent: Sep. 7, 2021

(54) ARRANGEMENT TO CALIBRATE A CAPACITIVE SENSOR INTERFACE

(71) Applicant: Knowles Electronics, LLC, Itasca, IL (US)

(72) Inventors: Colin Steele, Edinburgh (GB); Rene Scheuner, Winterthur (CH); Thomas Christen, Zürich (CH); Mark Niederberger, Einsiedeln (CH)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/491,705

(22) PCT Filed: Mar. 7, 2018

(86) PCT No.: PCT/EP2018/055594
§ 371 (c)(1),
(2) Date: Sep. 6, 2019

(87) PCT Pub. No.: WO2018/172076
PCT Pub. Date: Sep. 27, 2018

(65) Prior Publication Data
US 2020/0249052 A1 Aug. 6, 2020

(30) Foreign Application Priority Data
Mar. 22, 2017 (EP) ..................... 17162320

(51) Int. Cl.
G01R 27/26 (2006.01)
G01D 5/24 (2006.01)
G01D 18/00 (2006.01)

(52) U.S. Cl.
CPC ............... *G01D 5/24* (2013.01); *G01D 18/00* (2013.01)

(58) Field of Classification Search
USPC .................. 324/660–663, 679, 686
See application file for complete search history.

(56) References Cited

U.S. PATENT DOCUMENTS

| | | |
|---|---|---|
| 3,445,596 A | 5/1969 | Drake et al. |
| 5,596,289 A | 1/1997 | Liu |

(Continued)

FOREIGN PATENT DOCUMENTS

| | | |
|---|---|---|
| CN | 102957388 B | 11/2016 |
| EP | 2 237 414 A2 | 10/2010 |

(Continued)

OTHER PUBLICATIONS

European Patent Office, International Search Report for PCT/JP2018/055594, dated May 8, 2018.

(Continued)

*Primary Examiner* — Vincent Q Nguyen
(74) *Attorney, Agent, or Firm* — Foley & Lardner LLP

(57) ABSTRACT

An arrangement (2) to calibrate a capacitive sensor interface (1) includes a capacitive sensor (10) having a capacitance (cmem, cmemsp, cmemsm) and a charge storing circuit (20) having a changeable capacitance (cdum, cdump, cdumm). A test circuit (30) applies a test signal (vtst) to the capacitive sensor (10) and the charge storing circuit (20). An amplifier circuit (40) has a first input connection (E40a) coupled to the capacitive sensor (10) and a second input connection (E40b) coupled to the charge storing circuit (20). The amplifier circuit (40) provides an output signal (Vout) in dependence on a first input signal (ΔVerr1) applied to the first input connection (E40a) and a second input signal (ΔVerr2) applied to the second input connection (E40b). A control circuit (60) is configured to trim the capacitance (cdum, cdump, cdumm) of the charge storing circuit (20) such that the level of the output signal (Vout) tends to the level of zero.

20 Claims, 4 Drawing Sheets

(56) References Cited

U.S. PATENT DOCUMENTS

| | | |
|---|---|---|
| 5,712,591 A | 1/1998 | Maag et al. |
| 7,190,038 B2 | 3/2007 | Dehe et al. |
| 7,473,572 B2 | 1/2009 | Dehe et al. |
| 7,781,249 B2 | 8/2010 | Laming et al. |
| 7,795,695 B2 | 9/2010 | Weigold et al. |
| 7,816,978 B1 | 10/2010 | Lo et al. |
| 7,825,484 B2 | 11/2010 | Martin et al. |
| 7,829,961 B2 | 11/2010 | Hsiao |
| 7,856,804 B2 | 12/2010 | Laming et al. |
| 7,903,831 B2 | 3/2011 | Song |
| 9,503,814 B2 | 11/2016 | Schultz et al. |
| 9,635,460 B2 | 4/2017 | Schultz et al. |
| 9,641,137 B2 | 5/2017 | Duenser et al. |
| 10,045,104 B2 | 8/2018 | Qutub et al. |
| 10,153,740 B2 | 12/2018 | Albers et al. |
| 10,523,162 B2 | 12/2019 | Albers et al. |
| 2005/0207605 A1 | 9/2005 | Dehe et al. |
| 2006/0147061 A1 | 7/2006 | Niwa et al. |
| 2007/0133820 A1 | 6/2007 | Konchitsky |
| 2007/0278501 A1 | 12/2007 | MacPherson et al. |
| 2008/0075306 A1* | 3/2008 | Poulsen ............... H04R 29/004 381/111 |
| 2008/0175425 A1 | 7/2008 | Roberts et al. |
| 2008/0267431 A1 | 10/2008 | Leidl et al. |
| 2008/0279407 A1 | 11/2008 | Pahl |
| 2008/0283942 A1 | 11/2008 | Huang et al. |
| 2009/0001553 A1 | 1/2009 | Pahl et al. |
| 2009/0152655 A1 | 6/2009 | Laming et al. |
| 2009/0180655 A1 | 7/2009 | Tien et al. |
| 2010/0046780 A1 | 2/2010 | Song |
| 2010/0052082 A1 | 3/2010 | Lee et al. |
| 2010/0128914 A1 | 5/2010 | Khenkin |
| 2010/0176882 A1 | 7/2010 | Wei |
| 2010/0177913 A1 | 7/2010 | Chiu et al. |
| 2010/0183181 A1 | 7/2010 | Wang |
| 2010/0246877 A1 | 9/2010 | Wang et al. |
| 2010/0290644 A1 | 11/2010 | Wu et al. |
| 2010/0322443 A1 | 12/2010 | Wu et al. |
| 2010/0322451 A1 | 12/2010 | Wu et al. |
| 2011/0013787 A1 | 1/2011 | Chang |
| 2011/0075875 A1 | 3/2011 | Wu et al. |
| 2011/0142261 A1 | 6/2011 | Josefsson |
| 2012/0121106 A1 | 5/2012 | Henriksen |
| 2013/0015919 A1 | 1/2013 | Kropfitsch et al. |
| 2013/0044898 A1 | 2/2013 | Schultz et al. |
| 2013/0051582 A1 | 2/2013 | Kropfitsch et al. |
| 2013/0271307 A1 | 10/2013 | Kropfitsch et al. |
| 2013/0279717 A1 | 10/2013 | Reimann et al. |
| 2014/0064523 A1* | 3/2014 | Kropfitsch ............... H03F 3/181 381/174 |
| 2014/0307885 A1 | 10/2014 | Schultz et al. |
| 2015/0110291 A1 | 4/2015 | Furst et al. |
| 2015/0125003 A1 | 5/2015 | Wiesbauer et al. |
| 2015/0369768 A1 | 12/2015 | Sul et al. |
| 2016/0149542 A1 | 5/2016 | Mucha et al. |
| 2016/0150325 A1 | 5/2016 | Oliaei |
| 2016/0173992 A1 | 6/2016 | Nicollini et al. |
| 2016/0352294 A1 | 12/2016 | Nicollini et al. |
| 2017/0064424 A1 | 3/2017 | Qutub et al. |
| 2018/0012588 A1 | 1/2018 | Albers et al. |
| 2019/0081598 A1 | 3/2019 | Albers et al. |
| 2019/0387326 A1 | 12/2019 | Hansen et al. |
| 2020/0010315 A1 | 1/2020 | Tingleff et al. |
| 2020/0154223 A1 | 5/2020 | Du et al. |
| 2020/0252728 A1 | 8/2020 | Niederberger |
| 2020/0252729 A1 | 8/2020 | Mueller et al. |

FOREIGN PATENT DOCUMENTS

| | | |
|---|---|---|
| EP | 2 549 643 A1 | 1/2013 |
| EP | 2 653 845 | 10/2013 |
| EP | 2 653 845 A1 | 10/2013 |
| EP | 3 379 204 A1 | 9/2018 |
| GB | 2 525 674 A | 11/2015 |
| JP | H08-331696 A | 12/1996 |
| JP | 2003-259476 A | 9/2003 |
| JP | 2006-087074 A | 3/2006 |
| JP | 2008-005439 A | 1/2008 |
| TW | 201104272 A | 2/2011 |
| WO | WO-94/23547 A1 | 10/1994 |
| WO | WO-02/03747 A2 | 1/2002 |
| WO | WO-2013/025914 A2 | 2/2013 |
| WO | WO-2014/168813 A1 | 10/2014 |
| WO | WO-201 5/003930 A1 | 1/2015 |
| WO | WO-201 8/013571 A1 | 1/2018 |
| WO | WO-201 8/106514 A1 | 6/2018 |
| WO | WO-201 8/152003 A1 | 8/2018 |
| WO | WO-201 8/172076 A1 | 9/2018 |
| WO | WO-201 9/246151 A1 | 12/2019 |
| WO | WO-201 9/246152 A1 | 12/2019 |

OTHER PUBLICATIONS

Shin et al., "A Delta—Sigma Interface Circuit for Capacitive Sensors With an Automatically Calibrated Zero Point", IEEE Transactions on Circuits and Systrems—II: Express. Briefs, vol. 58, No. 2, pp. 90-94 (Feb. 2011).

U.S. Appl. No. 16/479,718, filed Jul. 22, 2019, Berthelsen et al.

Barbieri & Nicollini, "100+ dB A-Weighted SNR Microphone Preamplifier With On-Chip Decoupling Capacitors," IEEE Journal of Solid-State Circuits 47(11), pp. 2737-2750 (2012).

* cited by examiner

ARRANGEMENT TO CALIBRATE A CAPACITIVE SENSOR INTERFACE

TECHNICAL FIELD

The invention relates to an arrangement to calibrate a capacitive sensor interface that amplifies a signal of a capacitive sensor, in particular a MEMS microphone/MEMS transducer. The invention further relates to a method to calibrate a capacitive sensor interface.

BACKGROUND

Being high impedance, capacitive sensors and in particular MEMS microphones/MEMS transducers suffer from coupling of electrical disturbances from electrical sources such as EMC (Electro-Magnetic Compatibility) disturbance and, more concerning, self-generating disturbances such as switching on or reconfiguration. This causes unacceptable audio pops, clicks or hums.

The capacitive sensor may be connected to a capacitive sensor interface for amplifying the output signal of the capacitive sensor. The capacitive sensor interface may be configured as a single-input device which results in 0 dB rejection of disturbances. In order to minimize the occurrence of audio pops, clicks or hums when switching on or reconfiguring the capacitive sensor, for example a MEMS microphone, a pseudo-differential system or a true-differential system may be used.

In a differential system, a second (dummy) capacitive sensor, for example a second MEMS microphone/MEMS transducer is used in addition to the first (actual) capacitive sensor, for example a first MEMS microphone/MEMS transducer. The second capacitive sensor generates a dummy signal. An amplifier circuit of the capacitive sensor interface compares the signal received from of the first capacitive sensor and the dummy signal received from the second capacitive sensor to generate an output signal in dependence on the comparison between the signal received from the first capacitive sensor and the dummy signal received from the second capacitive sensor.

In a pseudo-differential system, instead of using a second capacitive sensor, an on-chip capacitor is provided in addition to capacitive sensor, for example the MEMS microphone/MEMS transducer. Similar to the differential system, an amplifier circuit is used to compare the signal received from the capacitive sensor and the dummy signal provided by the on-chip capacitor. The amplifier circuit generates an output signal in dependence on the comparing of the signal of the capacitive sensor and the dummy signal of the on-chip capacitor.

When using a capacitive sensor interface being configured as a differential or a pseudo-differential system, the occurrence of audio pops, clicks or hums may be reduced or nearly completely prevented under the condition that the capacitance of the first (actual) capacitive sensor and the capacitance of the second (dummy) capacitive sensor/on-chip capacitor are matched.

It is desired to provide an arrangement to calibrate a capacitive sensor interface such that the occurrence of audio pops, clicks or hums during operation of the capacitive sensor, particularly when switching on or reconfiguring the capacitive sensor, is prevented as far as possible. Another desire is to provide a method to calibrate a capacitive sensor interface such that the occurrence of audio pops, clicks or hums during operation of the capacitive sensor, particularly when switching on or reconfiguring the capacitive sensor, is prevented as far as possible.

SUMMARY

This aim and other objects that will become apparent hereinafter are achieved by an arrangement to calibrate a capacitive sensor interface as specified in claim 1.

The arrangement to calibrate a capacitive sensor interface comprises a capacitive sensor having a capacitance and a charge storing circuit having a changeable capacitance. The arrangement further comprises a test circuit to apply a test signal to the capacitive sensor and the charge storing circuit. The arrangement comprises an amplifier circuit having a first input connection coupled to the capacitive sensor and a second input connection coupled to the charge storing circuit and an output connection. The amplifier circuit is configured to provide an output signal at the output connection of the amplifier circuit in dependence on a first input signal applied to the first input connection of the amplifier circuit and a second input signal applied to the second input connection of the amplifier circuit. The arrangement comprises a detection circuit to detect a level of the output signal of the amplifier circuit and a control circuit. The control circuit is arranged to receive the detected level of the output signal of the amplifier circuit and is configured to trim the capacitance of the charge storing circuit such that the level of the output signal of the amplifier circuit tends to the level of zero.

An embodiment of a method to calibrate a capacitive sensor interface such that audio pops, clicks or hums are avoided as far as possible during operation of the capacitive sensor is specified in claim 13.

The method to calibrate the capacitive sensor interface comprises a first step of providing an arrangement to calibrate the capacitive sensor interface as described above. The test signal is generated and applied to the capacitive sensor and the charge storing circuit. The level of the output signal of the amplifier circuit is detected at the output connection of the amplifier circuit. The capacitance of the charge storing circuit is trimmed such that the level of the output signal at the output connection of the amplifier circuit tends to the level of zero.

The capacitive sensor may be configured as a MEMS microphone/MEMS transducer. The arrangement may be configured as (true) differential system, wherein the amplifier circuit is connected with its first input to the capacitive sensor and is connected with its second input to an additional, second capacitive sensor, for example another MEMS microphone/MEMS transducer. According to another embodiment, the arrangement may be configured as a pseudo-differential system, wherein the amplifier circuit is connected with its first input to the capacitive sensor and is connected with its second input to a capacitor having a changeable capacitance.

In order to measure if the capacitance of the capacitive sensor and the capacitance of the charge storing circuit are matched, the test circuit may comprise a voltage source and a capacitor being arranged between the voltage source and the capacitive sensor and the charge storing circuit. The voltage source may generate a pulse test signal injected onto the capacitor of the test circuit. The test signal will cause a disturbance at the input of the differential/pseudo-differential system comprising the capacitive sensor and the charge storing circuit. When the capacitance of the capacitive sensor and the capacitance of the charge storing circuit are trimmed to match, the output signal at the output connection of the amplifier circuit will tend to zero, for example to 0 V.

The arrangement to calibrate the capacitive sensor interface provides an on-chip auto-calibration technique for matching differential input impedances of the actual capacitive sensor, for example a first MEMS microphone/MEMS transducer and, in case of a true differential system, the capacitance of an additional (dummy) capacitive sensor, for example a second MEMS microphone/MEMS transducer, and, in case of a pseudo differential system, for matching the input impedances of the capacitive sensor and the capacitance of a capacitor. The arrangement may either improve, in case of a true differential system, the matching between the respective capacitances of two capacitive sensors, for example two MEMS transducers, or, in case of a pseudo-differential system, match the capacitance of an on-chip capacitor to the capacitance of the actual capacitive sensor, for example a MEMS microphone/MEMS transducer.

The resulting calibrated differential/pseudo-differential system will improve classic key parameters such as PSRR (Power Supply Rejection Ratio), but will also minimize MEMS microphone specific parameters such as susceptibility to charge pump noise and start-up transients by at least one order (common-mode rejection, CMRR). Susceptibility of external disturbances such as charge pump start-up, charge pump noise, and power supply will be suppressed in a robust and controlled manner (common-mode rejection of differential system).

DETAILED DESCRIPTION

The proposed arrangement to calibrate a capacitive sensor interface will now be described in more detail hereinafter with reference to the accompanying drawings showing different embodiments of the arrangement. The arrangement to calibrate a capacitive sensor interface may, however, be embodied in many different forms and should not be construed as limited to the embodiments set forth herein; rather, these embodiments are provided so that the disclosure will fully convey the scope of the arrangement. The drawings are not necessarily drawn to scale but are configured to clearly illustrate the design of the arrangement.

Figure 1:
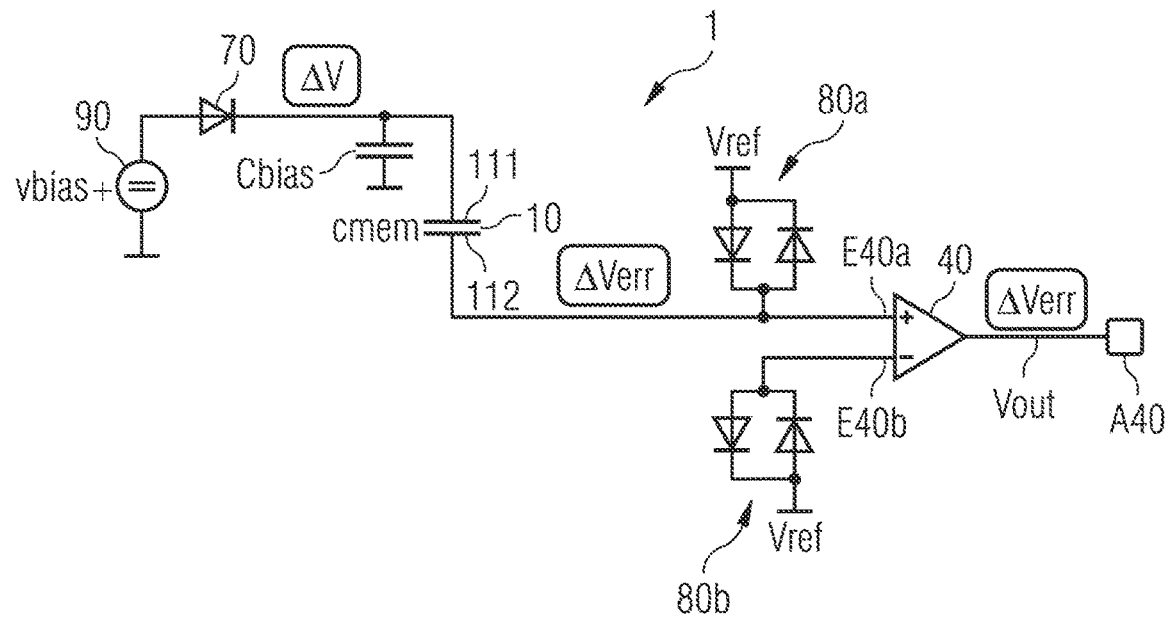
FIG. 1 shows an embodiment of a capacitive sensor interface having a single-input configuration.

FIG. 1 shows an embodiment of a capacitive sensor interface 1 designed in a single-input configuration. The capacitive sensor interface 1 comprises a capacitive sensor 10 having a capacitance cmem. The capacitive sensor 10 comprises a capacitor having an upper plate 111 and a bottom plate 112. The capacitive sensor 10 may be configured as a MEMS microphone/MEMS transducer. The upper plate 111 of the capacitive sensor/capacitor 10 is connected to a bias voltage source 90 to provide a bias voltage, for example a positive bias voltage vbias+. The bias voltage source 90 may be configured as a charge pump.

The bias voltage source 90 is connected via diode 70 to the capacitive sensor 10, in particular to the upper plate 111 of the capacitive sensor/capacitor 10. A capacitor Cbias may optionally be connected between the cathode of the diode 70 and the ground potential. The bottom plate 112 of the capacitive sensor/capacitor 10 is connected to a first input connection E40a of an amplifier circuit 40. The first input connection E40a of the amplifier circuit 40 is connected via a first pair of anti-parallel coupled diodes 80a to ground. A second input connection E40b of the amplifier circuit 40 is coupled via a second pair of anti-parallel coupled diodes 80b to ground. As an alternative, the input connection E40b can be connected to a reference voltage, for example to the ground potential, without interconnecting the diodes 80a, 80b. The diodes 80a and 80b may optionally be replaced by any very high-impedance resistor, for example >>10 GΩ. So instead of the antiparallel diodes 80a, 80b a resistor or any circuit representing a high-impedance resistor could be used.

Capacitive sensors, such as MEMS microphones/MEMS transducers, suffer from coupling of electrical disturbances to an output A40 of the amplifier circuit 40. The electrical disturbances may be generated by external sources, such as EMC disturbance, or come from self-generated disturbances, such as switching on a MEMS microphone/MEMS transducer or reconfiguration of the MEMS microphone/MEMS transducer. The electrical disturbances coupled to the output connection A40 of the amplifier circuit 40 cause unacceptable audio pops, clicks or hums.

The capacitor sensor interface 1, as shown in FIG. 1, is configured as a single-input device resulting in 0 dB rejection of such disturbances. Any disturbance ΔV of the charge pump voltage results in an error voltage ΔVerr that occurs at the bottom plate 112 of the capacitive sensor/capacitor 10 and is transferred via the amplifier circuit 40 to the output connection A40 of the amplifier circuit 40. The configuration shown in FIG. 1 does not provide any rejection of common mode voltage.

Figure 2:
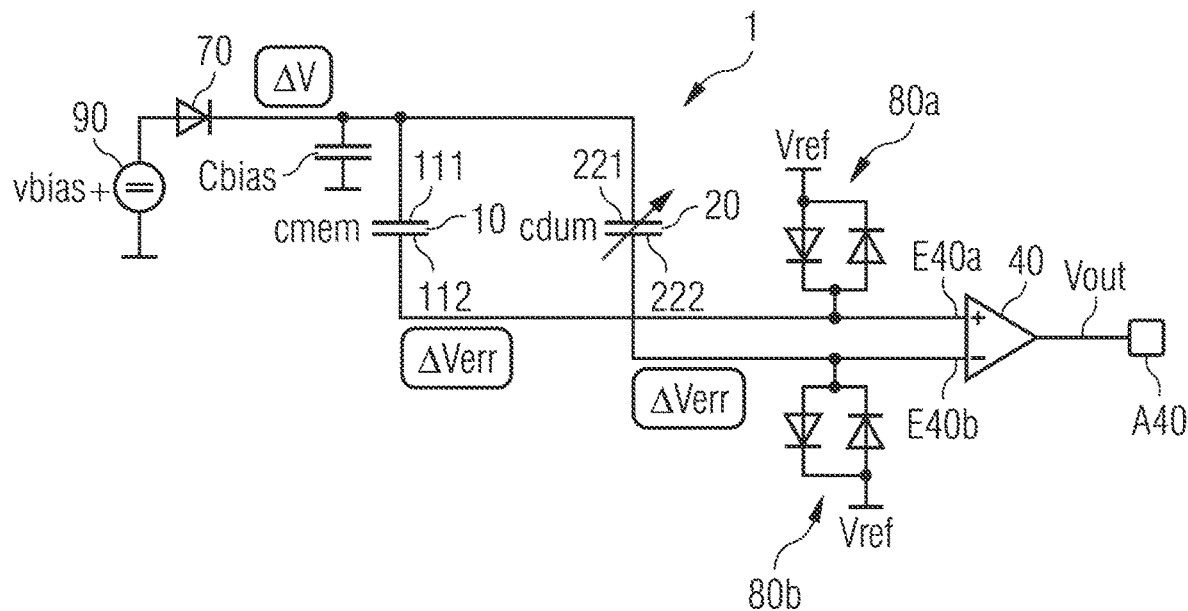
FIG. 2 shows an embodiment of a capacitive sensor interface having a differential input configuration.

FIG. 2 shows an embodiment of a capacitive sensor/MEMS microphone interface 1 being configured as a differential capacitive sensor/MEMS microphone interface. The capacitive sensor interface 1 comprises a capacitive sensor 10 comprising a capacitor having a capacitance cmem. The capacitive sensor 10 may be configured as a MEMS microphone/MEMS transducer. The capacitive sensor 10 is coupled to a amplifier circuit 40. In particular, the bottom plate 112 of the capacitive sensor 10 is coupled to an input connection E40a of the amplifier circuit 40.

The capacitive sensor interface 1 shown in FIG. 2 comprises a charge storing circuit 20 comprising a capacitor having a changeable capacitance cdum. In the case of a (fully/true) differential system, the charge storing circuit 20 may be configured as another/additional capacitive sensor, for example another MEMS microphone/MEMS transducer, or, in the case of a pseudo-differential system, as a capacitor. The charge storing circuit 20 is connected to a second input connection E40b of the amplifier circuit 40. In particular, a bottom plate 222 of the charge storing circuit/capacitor 20 is coupled to the second input connection E40b of the amplifier circuit 40.

The capacitive sensor 10 and the charge storing circuit 20 are biased by a bias voltage source 90 that provides the bias voltage vbias+ via diode 70 to the respective upper plate 111, 221 of the capacitive sensor 10 and the charge storing circuit 20. A capacitor Cbias may optionally be connected between the cathode of the diode 70 and the ground potential. The first input connection E40a of the amplifier circuit 40 is coupled via a first pair of anti-parallel coupled diodes 80a to a reference potential Vref, for example the ground potential. The second input connection E40b of the amplifier circuit 40 is coupled via a second pair of anti-parallel coupled diodes 80b to a reference potential Vref, for example the ground potential. The diodes 80a and 80b may optionally be replaced by any very high-impedance resistor, for example >>10 GΩ. So instead of the antiparallel diodes 80a, 80b a resistor or any circuit representing a high-impedance resistor could be used.

If the capacitance cmem of the capacitive sensor/capacitor 10 and the capacitance cdum of the charge storing circuit/capacitor 20 are matched, i.e. are equal, the capacitive sensor interface 1 shown in FIG. 2 provides a nearly perfect rejection of a common mode signal. The reconfiguration of the single-input capacitive sensor interface of FIG. 1 into a true-differential system or a pseudo-differential system, as shown in FIG. 2, thus minimizes the effect of audio pops, clicks or hums occurring in the system of FIG. 1 due to electrical disturbances on the bias voltage.

However, the problem to be solved is to achieve accurate differential matching between the respective capacitances of the capacitive sensor/capacitor 10 and the charge storing circuit/changeable capacitor 20. This is especially crucial when one of the components is an external MEMS transducer with a capacitance tolerance of usually at least +/−40%, while the other one is an on-chip capacitor, for example in the pseudo-differential system.

Figure 3:
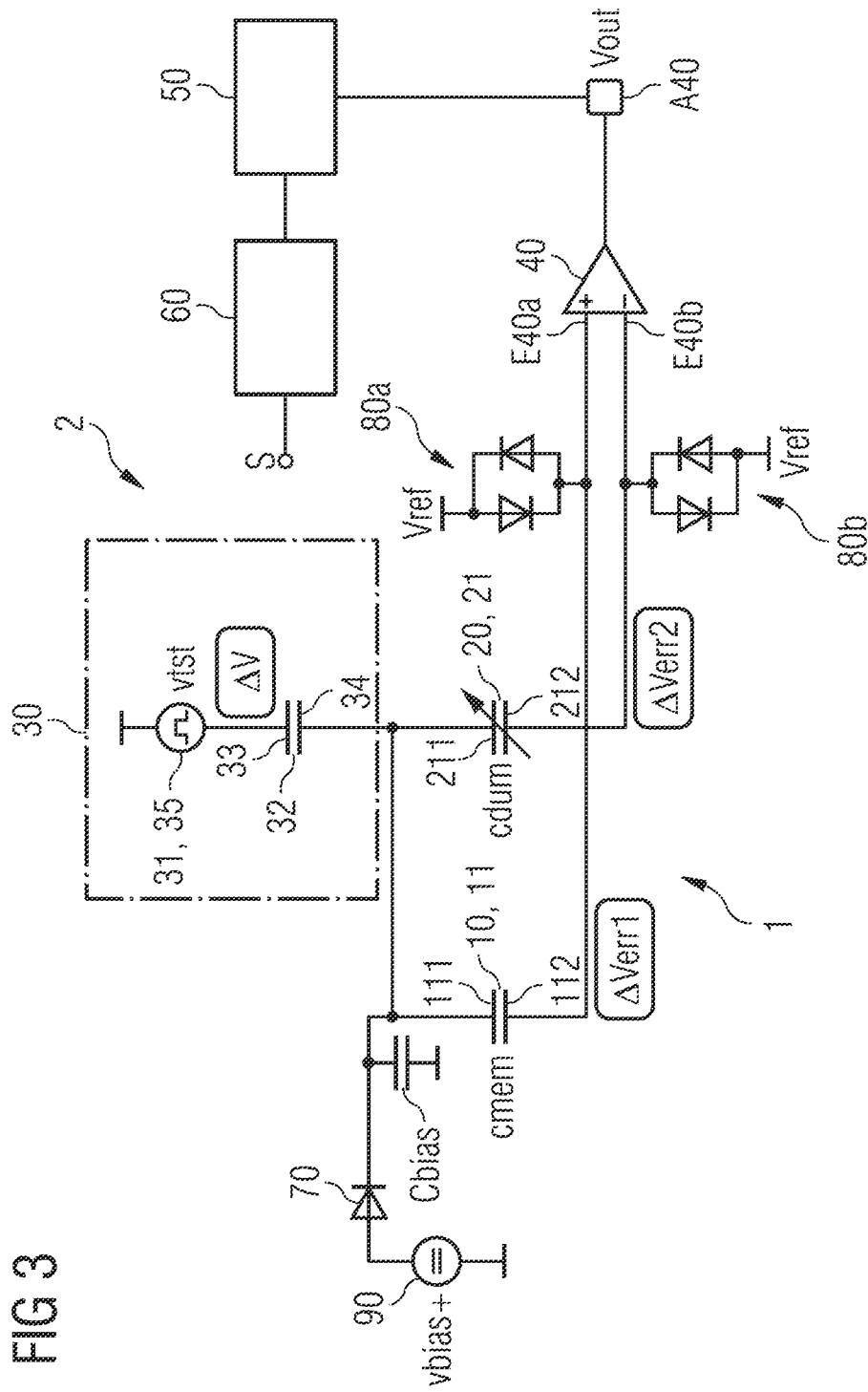
FIG. 3 shows an embodiment of an arrangement to calibrate a capacitive sensor interface being configured as a pseudo-differential system.

FIG. 3 shows an embodiment of an arrangement 2 to calibrate a capacitive sensor interface 1. The arrangement 2 comprises a capacitive sensor 10 comprising a capacitor 11 having a capacitance cmem. The arrangement 2 comprises a charge storing circuit 20 comprising at least one capacitor 21 having a changeable capacitance cdum. The arrangement further comprises a test circuit 30 to apply a test signal vtst to the capacitive sensor 10 and the charge storing circuit 20.

Furthermore, the arrangement 2 comprises an amplifier circuit 40 having a first input connection E40a coupled to the capacitive sensor 10 and a second input connection E40b coupled to the charge storing circuit 20. The amplifier circuit 40 is configured to provide an output signal Vout at an output connection A40 of the amplifier circuit in dependence on a first input signal ΔVerr1 applied to the first input connection E40a and in dependence on a second input signal ΔVerr2 applied to the second input connection E40b, for example when the test signal vtst is applied to the capacitive sensor 10 and the charge storing circuit 20.

According to the embodiment of the arrangement 2 to calibrate the capacitive sensor interface 1, the arrangement comprises a first pair of anti-parallel coupled diodes 80a and a second pair of anti-parallel coupled diodes 80b. The first pair of the anti-parallel coupled diodes 80a is arranged between the first input connection E40a of the amplifier circuit 40 and a reference potential Vref, for example the ground potential. The second pair of anti-parallel coupled diodes 80b is arranged between the second input connection E40b of the amplifier circuit 40 and a reference potential Vref, for example the ground potential. The diodes 80a and 80b may optionally be replaced by any very high-impedance resistor, for example >>10 GΩ. So instead of the antiparallel diodes 80a, 80b a resistor or any circuit representing a high-impedance resistor could be used.

The arrangement 2 comprises a bias voltage source 90 to bias the capacitive sensor 10. The bias voltage source 90 may generate a positive bias voltage vbias+. The bias voltage source 90 is connected to a ground potential and coupled to the capacitive sensor 10 and the charge storing circuit 20 to bias the capacitive sensor 10 and the charge storing circuit 20. The arrangement 2 further comprises a diode 70. A first side, for example the anode of the diode 70, is coupled to the bias voltage source 90 and a second side of the diode 70, for example the cathode of the diode 70, is coupled to the capacitive sensor 10 and the charge storing circuit 20. A capacitor Cbias may optionally be connected between the cathode of the diode 70 and the ground potential.

The arrangement 2 further comprises a detection circuit 50 to detect a level of the output signal Vout. A control circuit 60 is provided in the arrangement 2 to receive the detected level of the output signal Vout. The control circuit 60 is configured to trim the capacitance cdum of the charge storing circuit/capacitor 20 such that the level of the output voltage Vout at the output connection A40 of the amplifier circuit 40 tends to the level of zero, when the test circuit 30 generates and applies the test signal vtst to the capacitive sensor 10 and the charge storing circuit 20. That means that the control circuit 60 changes the capacitance cdum of the charge storing circuit/capacitor 20 such that the level of the output signal is in a small range about the zero-level.

The test circuit 30 may comprise a test signal generator 31 to generate the test signal vtst. The test signal generator 31 may be configured as a voltage source generating a test voltage signal. The test circuit 30 may further comprise a capacitor 32 having a first plate 33 connected to the test signal generator 31 and a second plate 34 coupled to the capacitive sensor 10 and the charge storing circuit 20. The test circuit 30 is coupled to the same side of the capacitive sensor 10 and the charge storing circuit 20 to which the bias voltage source 90 is connected. The test circuit 30 and the bias voltage source 90 are both connected to an upper plate 111 of the capacitor 11 of the capacitive sensor 10 and the upper plate 211 of the capacitor 21 of the charge storing circuit 20. The first input connection E40a of the amplifier circuit 40 is coupled to a bottom plate 112 of the capacitor 11 of the capacitive sensor 10. The second input connection E40b of the amplifier circuit 40 is connected to a bottom plate 212 of the changeable capacitor 21 of the charge storing circuit 20.

If the test signal generated by the test circuit 30 is a test voltage, the control circuit changes the capacitance cdum of the charge storing circuit/capacitor 20 such that the level of the output signal Vout tends to 0 V. The control circuit 60 may change the capacitance cdum of the charge storing/capacitor 20 such that the level of the output voltage Vout of the amplifier circuit 40 is in a small range, for example a range of about +/−5 mV around 0 V.

According to the embodiment of the arrangement 2 shown in FIG. 3, the capacitive sensor 10 may be configured as a MEMS microphone/MEMS transducer. The capacitive sensor interface 1 shown in FIG. 3 is a pseudo-differential system. The charge storing circuit 20 may comprise an on-chip capacitor 21 having the changeable capacitance cdum. The on-chip capacitor is arranged on the same substrate of the chip on which the test circuit 30, the amplifier circuit 40, the detection circuit 50 and the control circuit 60 are also arranged. The arrangement 2 to calibrate the capacitive sensor interface 1 shown in FIG. 3 enables a pseudo-differential calibration, where the capacitance cdum of the capacitor 21 is tuned to match the capacitance cmem of the capacitive sensor 10, for example the MEMS microphone/MEMS transducer.

Figure 4:
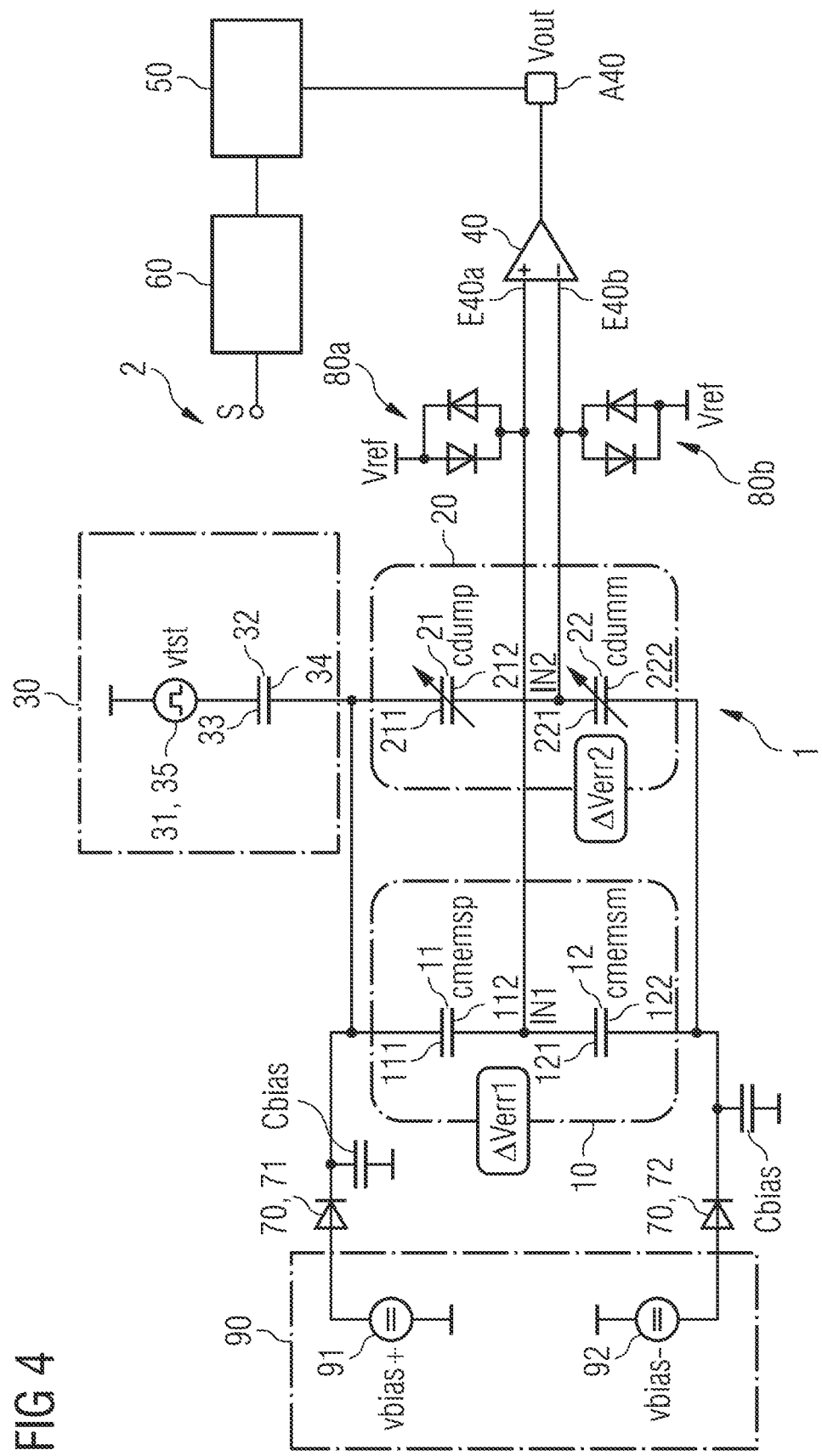
FIG. 4 shows an embodiment of an arrangement to calibrate a capacitive sensor interface being configured as a differential system.

FIG. 4 shows another embodiment of an arrangement 2 to calibrate a capacitive sensor interface 1. The arrangement 2 comprises a capacitive sensor 10 that may be configured as a MEMS microphone/MEMS transducer. The arrangement further comprises a charge storing circuit 20 having a changeable capacitance cdump, cdumm.

The arrangement 2 comprises an amplifier circuit 40 having a first input connection E40a and a second input connection E40b as well as an output connection A40. The amplifier circuit 40 is arranged such that the first input connection E40a is coupled to the capacitive sensor 10 and the second input connection E40b is coupled to the charge storing circuit 20. The amplifier circuit 40 is configured to provide an output signal Vout at the output connection A40. The output signal Vout is generated by the amplifier circuit 40 in dependence on a first input signal ΔVerr1 applied to the first input connection E40a and a second input signal ΔVerr2 applied to the second input connection E40b.

The arrangement 2 further comprises a first pair of anti-parallel coupled diodes 80a being arranged between the first input connection E40a of the amplifier circuit 40 and a reference potential Vref, for example the ground potential. Furthermore, the arrangement 2 comprises a second pair of anti-parallel coupled diodes 80b being arranged between the second input connection E40b of the amplifier circuit 40 and a reference potential Vref, for example the ground potential. The diodes 80a and 80b may optionally be replaced by any very high-impedance resistor, for example >>10 GΩ. So instead of the antiparallel diodes 80a, 80b a resistor or any circuit representing a high-impedance resistor could be used.

A bias voltage source 90 is provided to bias the capacitive sensor 10. The bias voltage source 90 is coupled to the capacitive sensor 10. The bias voltage source 90 is also arranged to bias the charge storing circuit 20 and thus is coupled to the charge storing circuit 20 as well. The arrangement 2 further comprises a diode circuit 70 that is coupled with its first side, for example the anode, to the bias voltage source 90. The second side of the diode circuit 70, for example the cathode, may be coupled to the capacitive sensor 10 and the charge storing circuit 20. A capacitor Cbias may optionally be connected between the cathode of the diode 70 and the ground potential.

According to the embodiment of the arrangement 2 shown in FIG. 4, the capacitive sensor 10 is configured as a (true) differential sensor, for example a differential MEMS microphone/MEMS transducer, comprising a first capacitor 11 and a second capacitor 12. The charge storing circuit 20 may be configured as another capacitive sensor, for example another MEMS microphone/MEMS transducer. As shown for the differential system of FIG. 4, the charge storing circuit 20 may comprise a first changeable capacitor 21 and a second changeable capacitor 22. The first and the second changeable capacitors may be part of a second MEMS microphone/MEMS transducer.

The first input connection E40a of the amplifier circuit 40 is connected to a first node IN1 between the first and the second capacitor 11, 12 of the capacitive sensor 10, for example the MEMS microphone/MEMS transducer. The second input E40b of the amplifier circuit 40 is connected to a second node IN2 between the first changeable capacitor 21 and the second changeable capacitor 22 of the charge storing circuit 20, for example a second MEMS microphone/MEMS transducer.

The bias voltage source 90 may comprise a first bias voltage source 91 and a second bias voltage source 92 respectively connected to a ground potential. The bias voltage sources 91 and 92 may be configured as charge pumps. The first bias voltage source 91 is configured to provide a positive bias voltage vbias+. The first bias voltage source 91 is coupled to the first capacitor 11 of the capacitive sensor 10 and to the first changeable capacitor 21 of the charge storing circuit 20. As shown in FIG. 4, the first bias voltage 91 is coupled via a first diode 71 of the diode circuit 70 to the first capacitor 11 of the capacitive sensor 10 and the first changeable capacitor 21 of the charge storing circuit 20.

The second bias voltage source 92 is configured to provide a negative bias voltage vbias−. The second bias voltage source 92 is coupled to the second capacitor 12 of the capacitive sensor 10 and the second changeable capacitor 22 of the charge storing circuit 20. The second bias voltage source 92 is coupled via a second diode 72 of the diode circuit 70 to the first capacitor 11 of the capacitive sensor 10 and the first changeable capacitor 21 of the charge storing circuit 20.

The arrangement 2 comprises a test circuit 30 to apply a test signal vtst to the capacitive sensor 10 and the charge storing circuit 20. The test circuit 30 comprises a test signal generator 31 to generate the test signal vtst. The test signal generator may be configured as a voltage source generating a test voltage signal. As shown in FIG. 4, the test circuit 30 further comprises a capacitor 32 having a first plate 33 and a second plate 34. The first plate 33 of the capacitor 32 is connected to the test signal generator 31. The second plate 34 of the capacitor 32 is coupled to the capacitive sensor 10 and the charge storing circuit 20.

According to the embodiment of the arrangement 2 shown in FIG. 4, the test circuit 30 as well as the bias voltage source 91 are both coupled to the upper plate 111 of the capacitor 11 of the capacitive sensor 10 and the upper plate 211 of the changeable capacitor 21 of the charge storing circuit 20. The second bias voltage source 92 is coupled to the lower plate 122 of the second capacitor 12 of the capacitive sensor 10 and the lower plate 222 of the second changeable capacitor 22 of the charge storing circuit 20. The first node IN1 is connected to the lower plate 112 of the first capacitor 11 and the upper plate 121 of the second capacitor 12 of the capacitive sensor 10. The second node IN2 is connected to the bottom plate 212 of the first capacitor 21 and the upper plate 221 of the second changeable capacitor 22 of the charge storing circuit 20.

The capacitance cmem of the capacitive sensor 10 shown in FIG. 3 as well the capacitance cmemsp, cmemsm of the differential capacitive sensor 10 shown in FIG. 4 may vary about +/−40%. Trimming of the capacitance cdum of the charge storing circuit 20 of FIG. 3 or the capacitances cdump, cdumm of the charge storing circuit 20 of FIG. 4 will achieve a balanced system.

In order to adjust the capacitance cdum, respectively the capacitances cdump, cdumm, to the capacitance cmem, respectively the capacitances cdmemsp, cmemsm, of the capacitive sensor 10, the test signal vtst is generated by the test circuit 30 and applied to the capacitive sensor 10 and the charge storing circuit 20. The test signal vtst may be a square wave signal comprising a sequence of pulses having positive and negative edges. In the case that the test signal is a test voltage signal, the amplifier circuit 40 generates an output voltage signal Vout having a level above a positive threshold around 0 V or below a negative threshold around 0 V, if the capacitance cdum or cdump, cdumm of the charge storing circuit 20 and the capacitance cmem or cmemsp, cmemsm of the capacitive sensor 10 are not matched. In this case the capacitive sensor interface 1 generates an audible noise, usually audio pops, clicks or hums, when the capacitive sensor 10, for example a MEMS microphone/MEMS transducer, is switched on, or the bias voltages vbias−, vbias+ are disturbed under EMC conditions etc.

If the capacitance cdum respectively the capacitances cdump, cdumm of the charge storing circuit 20 and the capacitance cmem respectively cmemsp, cmemsm of the capacitive sensor 10 are matched, the amplifier circuit 40 generates an output voltage that tends to 0 V, if the test voltage signal vtst is applied to the capacitive sensor 10 and the charge storing circuit 20. In the case of a proper trimmed charge storing circuit 20, for example the changeable capacitor 21 shown in FIG. 3 or the changeable capacitors 21, 22 shown in FIG. 4, the output voltage Vout of the amplifier circuit 40 tends to 0 V when the capacitive sensor 10 is switched on. In this case any audible noise, such as pops, clicks or hums, is not audible when the capacitive sensor, particularly a MEMS microphone/MEMS transducer, is switched on.

In order to adjust the capacitance cdum, respectively cdump, cdumm, the detection circuit 50 detects a level of the output signal Vout, when the test signal vtst is applied to the capacitive sensor 10 and the charge storing circuit 20. The control circuit 60 receives the detected level of the output signal Vout. The control circuit 60 may be configured to generate a control signal S to trim the capacitance cdum, respectively the capacitances cdump, cdumm, of the changeable capacitors of the charge storing circuit 20 such that the level of the output signal Vout, for example a voltage level, at the output connection A40 of the amplifier circuit 40 tends to zero, for example to 0 V. The control circuit 60 may be configured such that the capacitances cdum, respectively cdump, cdumm, of the charge storing circuit 20 is/are trimmed such that the level of the output voltage Vout remains in a small range, for example in a range of +/−5 mV, around 0 V.

As shown in FIG. 4, the pseudo-differential arrangement of FIG. 3 has been extended to a true differential capacitive sensor, for example a true differential MEMS microphone/MEMS transducer, with unbalanced charge pumps 91 and 92. Non-correlated start-up of the charge pumps 91 and 92 will be suppressed by the differential system.

It is proposed that the calibration be performed at start-up. As a result, the test signal vtst should be orthogonal to the audio signal. For an analogue system, a random test signal could be generated by a PRSG (Pseudo-Random Sequence Generator) clocked at 1 MHz comprising some 12 bits. This will result in a tone at about 244 Hz. Since the spectral power will be low, the tone will be non-audible. In a digital system, a better random sequence generator may be available. The test circuit 30 may comprise for example a sigma-delta modulator 31. The sigma-delta modulator 31 may be configured as a high-order sigma-delta modulator. In this case the test signal vtst may be generated by using the least significant bit generated by the sigma-delta modulator 31.

The method to calibrate the capacitive sensor interface 1 enables a pseudo-differential calibration, where the (on-chip) capacitor 21 of the charge storing circuit 20 shown in FIG. 3 is tuned to match the capacitance cmem of the capacitive sensor 10, for example the capacitance cmem of a MEMS microphone/MEMS transducer. The arrangement 2 shown in FIG. 4 enables a differential calibration, where the capacitances cdump and cdumm of a second capacitive sensor, for example a second MEMS microphone/MEMS transducer, are tuned to match the capacitances cmemsp and cmemsm of the capacitive sensor 10, for example a first MEMS microphone/MEMS transducer.

Figure 5:
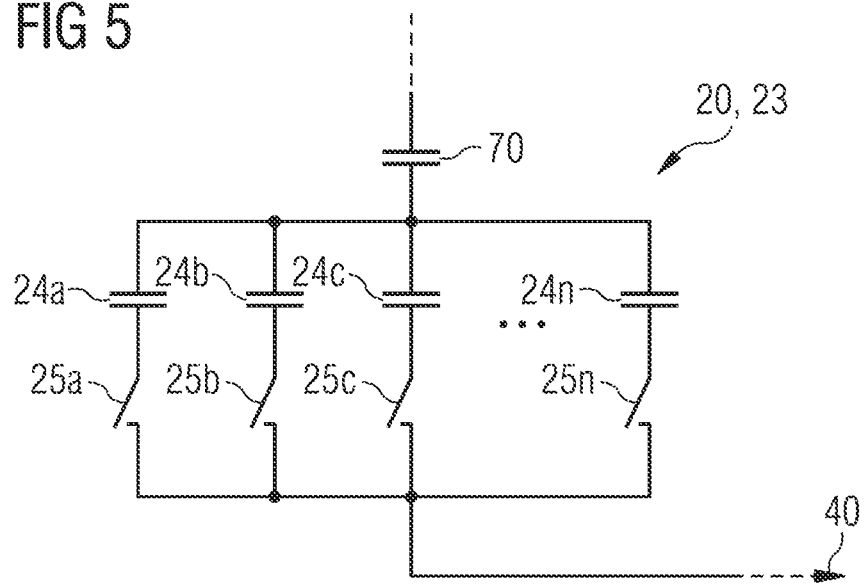
FIG. 5 shows an embodiment of trimmable capacitors being arranged in an array.

FIG. 5 shows an embodiment of the charge storing circuit 20 being configured as a trimming array 23 comprising switchable capacitors 24a, ..., 24n. The switchable capacitors may be switched in/out to balance the matching. In order to improve the resolution accuracy, the control circuit 60 may be configured to control the array 23 of the switchable capacitors 24a, ..., 24n by using a digital dither to randomly switch the switchable capacitors 24a, ..., 24n on and off. The use of digital dithering enables to linearize the capacitances cdum, respectively cdump, cdumm provided by the charge storing circuit 20 between quantization steps of the individual capacitors 24a, ... 24n. According to a preferred embodiment the dither is performed at a frequency $f_s$ used by the test signal generator 31 to generate the test signal vtst so that the dither will be non-audible.

Figure 6:
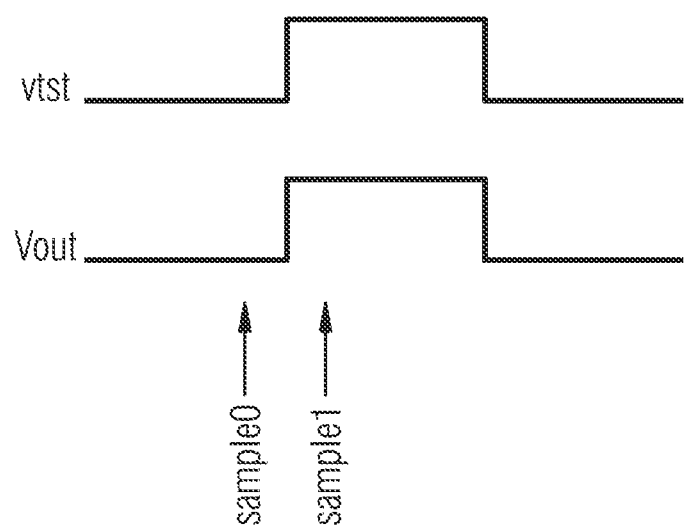
FIG. 6 illustrates a test signal sampling method for realizing a correlated double-sampling scheme.

FIG. 6 shows an embodiment of a method to detect the level of the output signal Vout. The method is configured as a sampling method using a correlated double-sampling (CDS) scheme to make the calibration accuracy independent of amplifier offset, etc. The output signal Vout is measured at the time marked by sample0 just before the test signal vtst is applied to the capacitive sensor 10 and the charge storing circuit 20. The output signal Vout is then sampled at a second time step sample1 during the test signal vtst is applied to the capacitive sensor 10 and the charge storing circuit 20. Since the time of transmission of the test signal vtst is known, the sampling of a random test signal may be correlated. As a result, high sensitivity correlated/phase locked sampling may be achieved that allows high impedance matching. The correlated sampling system shown in FIG. 6 allows to measure disturbances in the range of a few millivolts.

LIST OF REFERENCE SIGNS 1 capacitive sensor interface
2 arrangement to calibrate a capacitive sensor interface
10 capacitive sensor
11, 12 capacitors
20 charge storing circuit
21, 22 changeable capacitors
30 test circuit
31 test signal generator
32 capacitor
40 amplifier circuit
50 detection circuit
60 control circuit
70 diode/diode circuit
80a, 80b anti-parallel coupled diodes
90 bias voltage source
vtst test signal
Vout output signal

The invention claimed is:
1. A capacitive sensor arrangement, comprising:
a capacitive sensor;
a charge storing circuit having a changeable capacitance;
a test circuit configured to apply a test signal to the capacitive sensor and to the charge storing circuit;
an amplifier circuit having a first input coupled to the capacitive sensor and a second input coupled to the charge storing circuit, wherein the amplifier circuit is configured to provide an output signal at the output of the amplifier in response to application of the test signal to the capacitive sensor and to the charge storing circuit;,
a detection circuit configured to detect a level of the output signal; and a control circuit coupled to the detection circuit and configured to trim the capacitance of the charge storing circuit such that the output signal tends to zero.

2. The arrangement as claimed in claim 1, wherein the test circuit comprises a test signal generator configured to generate the test signal orthogonal to a sensor signal of the arrangement.

3. The arrangement as claimed in claim 1, wherein the test circuit comprises a test signal generator configured to generate the test signal as a sequence of pulses.

4. The arrangement as claimed in claim 1, further comprising a capacitor coupling the test circuit to the capacitive sensor and to the charge storing circuit.

5. The arrangement as claimed in claim 1, wherein the capacitive sensor is a MEMS transducer and the charge storing circuit comprises at least one changeable capacitor.

6. The arrangement as claimed in claim 5, further comprising: a bias voltage source coupled to the capacitive sensor and to the charge storing circuit, wherein the bias voltage source is configured to apply a bias voltage to the capacitive sensor and to the charge storing circuit.

7. The arrangement as claimed in claim 1, wherein the capacitive sensor is a differential MEMS transducer comprising a first capacitor and a second capacitor, a first node between the first capacitor and the second capacitor of the MEMS transducer coupled to the first input of the amplifier, the charge storing circuit comprising a first capacitor and a second capacitor, and a second node between the first capacitor and the second capacitor of the charge storing circuit coupled to the second input of the amplifier.

8. The arrangement as claimed in claim 1, wherein the changeable capacitance comprises switchable capacitors, and the control circuit is configured to control the switchable capacitors ON and OFF using a digital dither.

9. The arrangement as claimed in claim 1 further comprising a sigma delta modulator, wherein the test signal generator is configured to generate the test signal based on a least significant bit generated by the sigma delta modulator.

10. A capacitive sensor interface circuit comprising:
a bias circuit coupleable to a charge storing circuit having a changeable capacitance and to a capacitive sensor, the bias circuit configured to apply a bias voltage to the charge storing circuit and to the capacitive sensor when the bias circuit is coupled to the capacitive sensor and to the charge storing circuit;
a test circuit coupleable to the charge storing circuit and to the capacitive sensor, the test circuit configured to apply a test signal to the charge storing circuit and to the capacitive sensor when the test circuit is coupled to the capacitive sensor and the charge storing circuit;
an amplifier circuit having a first input coupleable to the capacitive sensor and a second input coupleable to the charge storing circuit, wherein the amplifier circuit is configured to provide an output signal (Vout) at an output of the amplifier circuit in response to application of the test signal to the capacitive sensor and the charge string circuit;
a detection circuit configured to detect a level of the output signal (Vout);
a control circuit coupled to the detection circuit and configured to trim the capacitance of the charge storing circuit such that the level of the output signal (Vout) tends to zero when the test signal is applied to the charge storing circuit and to the capacitive sensor.

11. The interface circuit as claimed in claim 10, wherein the test circuit comprises a test signal generator configured to generate the test signal as a sequence of pulses.

12. The interface circuit as claimed in claim 10 further comprising a sigma delta modulator, wherein the test signal generator is configured to generate the test signal based on a least significant bit generated by the sigma delta modulator.

13. The interface circuit as claimed in claim 10 further comprising a charge storing circuit having a changeable capacitance, the charge storing circuit coupled to the bias circuit and to the test circuit.

14. The interface circuit as claimed in claim 13, wherein the changeable capacitance comprises switchable capacitors, and the control circuit is configured to control the switchable capacitors ON and OFF using a digital dither.

15. The interface circuit as claimed in claim 13 is an integrated circuit.

16. The interface circuit as claimed in claim 15 in combination with a capacitive transducer coupled to the bias circuit, wherein the capacitive sensor is a MEMS transducer.

17. A method in a capacitive sensor interface circuit, the method comprising: generating a bias signal for application to a capacitive sensor and to a charge storing circuit; generating a test signal for application to the capacitive sensor and the charge storing circuit when under bias;
generating a differential output signal based on input signals received from the capacitive sensor and the charge storing circuit in response to applying the test signal to the capacitive sensor and to the charge storing circuit;
detecting the differential output signal;
trimming a capacitance of the charge storing circuit using a control signal based on the detected differential output signal, wherein the control signal tends to reduce the differential signal to zero.

18. The method as claimed in claim 17, wherein generating the test signal comprises generating a sequence of pulses.

19. The method as claimed in claim 17, wherein generating the test signal comprises generating a sequence of pulses based on a least significant bit generated by a sigma delta modulator.

20. The method as claimed in claim 17, wherein trimming the capacitance comprises digitally controlling an array of switchable capacitors of the charge storing circuit ON and OFF.

* * * * *